United States Patent [19]

Hartmann et al.

[11] Patent Number: 5,047,758
[45] Date of Patent: Sep. 10, 1991

[54] METHOD OF DRIVING A PASSIVE FERRO-ELECTRIC LIQUID CRYSTAL DISPLAY DEVICE

[75] Inventors: Wilbert J. A. M. Hartmann; Karel E. Kuijk, both of Eindhoven, Netherlands

[73] Assignee: U. S. Philips Corporation, New York, N.Y.

[21] Appl. No.: 614,044

[22] Filed: Nov. 9, 1990

Related U.S. Application Data

[63] Continuation of Ser. No. 280,418, Dec. 6, 1988, abandoned.

[30] Foreign Application Priority Data

Dec. 16, 1987 [NL] Netherlands ............. 8703040

[51] Int. Cl.[5] .......................................... G09G 3/36
[52] U.S. Cl. ................................. 340/784; 340/805
[58] Field of Search ........................................ 340/811

[56] References Cited

U.S. PATENT DOCUMENTS 4,638,310  1/1987  Agliffe ........................... 340/784
4,705,345 11/1987  Ayliffe et al. ................. 340/784
4,709,995 12/1987  Kuribayashi et al. ......... 340/793
4,712,877 12/1987  Okada et al. .................. 340/793
4,728,947  3/1988  Agliffe et al. ................. 340/805
4,773,716  9/1988  Nakanowatari ............... 340/784
4,800,382  1/1989  Okada et al. .................. 340/805
4,915,477  4/1990  Ohta et al. ..................... 340/784

FOREIGN PATENT DOCUMENTS 0214856  3/1987  European Pat. Off. .
0214857  3/1987  European Pat. Off. .
2173336 10/1986  United Kingdom .

Primary Examiner—Jeffery A. Brier
Attorney, Agent, or Firm—Robert J. Kraus

[57] ABSTRACT

In a method of driving a passive ferro-electric display device the selection voltages, "blanking" voltages and data voltages are given a bipolar character so that the values of the data voltages with respect to the "blanking" voltage can be chosen to be so low that there is substantially no crosstalk. In a passive display device this provides the possibility of driving large numbers of lines (for example, for LCD-TV) while maintaining the contrast.

18 Claims, 4 Drawing Sheets

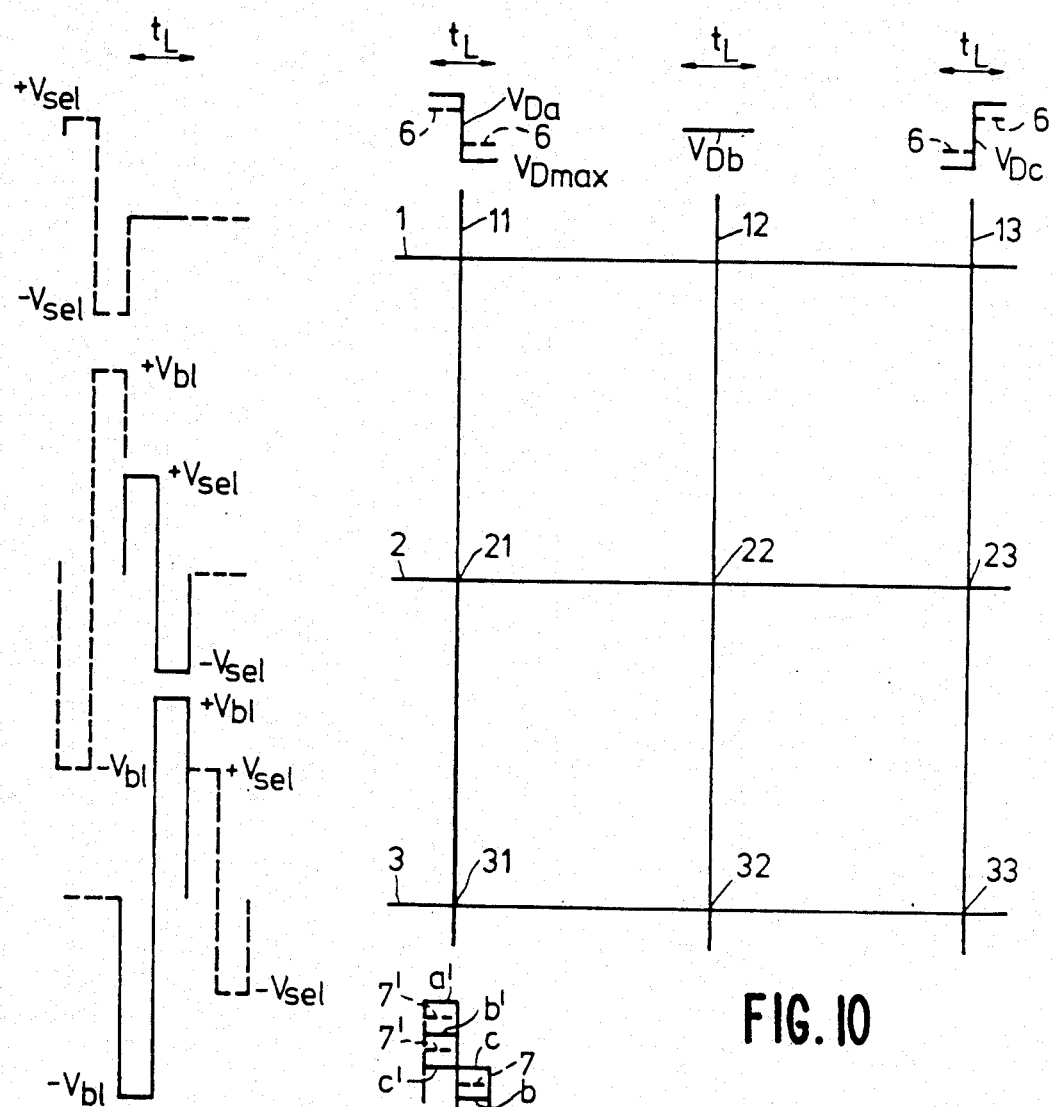
FIG. 10
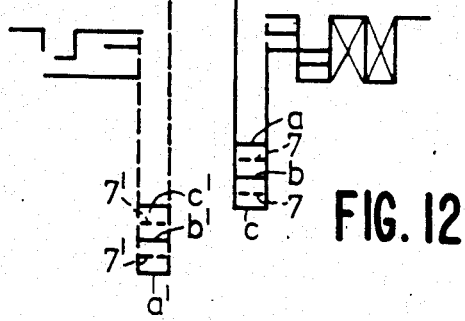
FIG. 11
FIG. 12

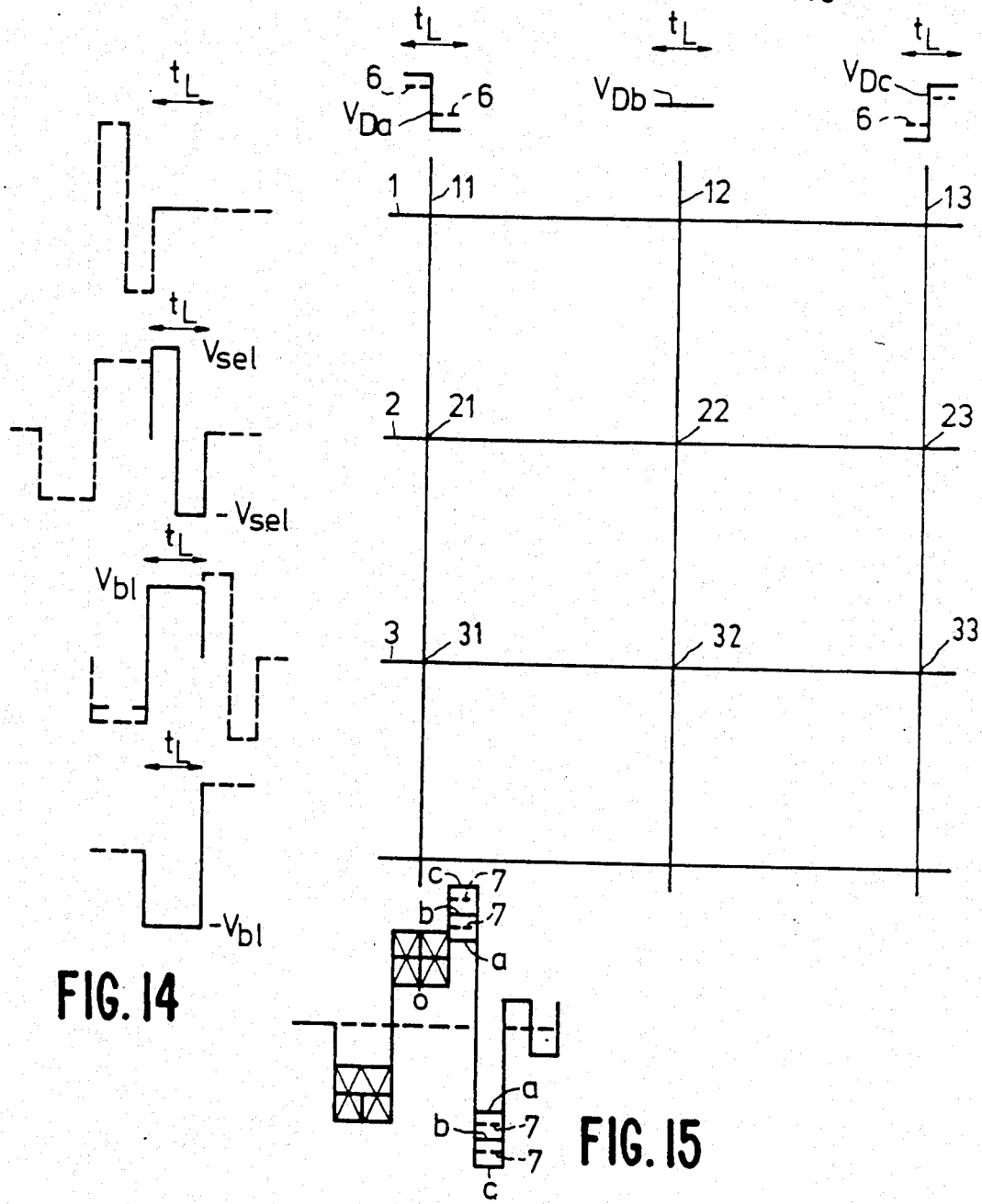

METHOD OF DRIVING A PASSIVE FERRO-ELECTRIC LIQUID CRYSTAL DISPLAY DEVICE

This is a continuation of application Ser. No. 07/280,418 filed Dec. 6, 1988 now abandoned.

BACKGROUND OF THE INVENTION

The invention relates to a method of driving a display device comprising a ferro-electric liquid crystalline medium between two supporting plates, the first plate comprising a system of row electrodes and the second plate comprising a system of column electrodes defining display elements at the area of the crossings of row and column electrodes, said display elements reaching a desired transmission state from an extreme transmission state during selection.

Such a method is suitable for driving passive matrices having large numbers of lines. Since the contrast is maintained, the method is very suitable for LCD-TV.

A method of the type mentioned in the opening paragraph is described in EP 0,214,857. In the method described in EP 0214857 the desired transmission states (grey scales) are obtained in that, dependent on the desired transmission value, a display element is switched on in n successive rasters during a weighted period. This implies that a picture memory is necessary and the ferro-electric liquid crystalline medium must switch n times as fast, notably in video uses. Moreover, the display element is never switched on completely during the second and subsequent selected rasters, which leads to loss of brightness.

SUMMARY OF THE INVENTION

It is an object of the invention to obviate these drawbacks by providing a method in which grey scales can be realized with signals which can simply be realized on both row and column electrodes, while the data voltages on the column electrodes can be maintained so low that possible crosstalk does not influence or hardly influences the electro-optical transmission value (grey scale) of the display medium.

The invention is based on the recognition that for a given pulse width (for example, equal to one line period or a part thereof) the transmission-voltage characteristic has a relatively small transition range and that the range used for the data voltages can substantially be limited to the width of this transition range.

To this end a method according to the invention is characterized in that during selection the display elements reach the desired transmission state from the extreme transmission state via drive voltages comprising bipolar auxiliary signals and bipolar selection signals as described below, on the row electrodes and data voltages on the column electrodes, which drive voltages and data voltages are bipolar, said desired transmission state being reached dependent on the data voltages which are substantially simultaneously presented with a bipolar selection signal which is presented to the row electrode at least for a part of a line period.

In this connection a bipolar signal is understood to mean a signal consisting of a sub-signal having a positive voltage and a sub-signal having a negative voltage, the duration and the voltage being substantially equal in absolute sense for the two sub-signals, or the voltage-time product (V·t) being equal. An extreme state is understood to mean such a state that the display element is either substantially light-transmissive or non-transmissive.

The use of bipolar signals results in that possible cross-talk causes the electro-optical transmission state of a display element to vary only around a given setting value (dynamic setting); moreover, in a method according to the invention, the crosstalk may be given such a low amplitude and/or a high frequency that this variation cannot be observed or can hardly be observed by the human eye.

For a small number of lines the entire device may be brought to an extreme state in advance by means of an auxiliary signal ("blanking"). For larger numbers of lines a bipolar auxiliary signal is preferably presented to a row electrode prior to the bipolar selection signal, which auxiliary signal has such a duration and height of each of the sub-signals that the display element is brought to an extreme state.

An additional advantage of the use of bipolar signals is the fact that the average voltage across a display element is substantially 0 Volt.

A first embodiment of a method according to the invention is characterized in that the auxiliary signal and the selection signal are presented within one line period. Preferably, for a given line period which is at least four times the switching period of the ferro-electric liquid crystalline medium, data voltages are presented which have a maximum value covering at least half the voltage range within which the transition from one extreme electro-optical state to another extreme electro-optical state is effected in the transmission-voltage characteristic associated with a quarter of the line period, while the absolute value of the parts of the auxiliary signal is at least equal to the sum of the absolute value of the maximum data signal and the absolute value of the parts of the selection signal.

This method has the advantage of a very low crosstalk.

In another embodiment the auxiliary signal is presented during at least one line period prior to the line period in which selection takes place.

In this method ferro-electric media having a longer switching time can be chosen or, conversely, media having the same switching time can be used for display devices having shorter line periods or lower voltages.

BRIEF DESCRIPTION OF THE DRAWING

The invention will now be described in greater detail, by way of example, with reference to the accompanying drawings in which FIG. 10 shows diagrammatically a second embodiment, and FIG. 11 shows selection signals used in conjunction with FIG. 10, FIG. 12 shows blanking signals used in conjunction with FIG. 10, FIG. 13 shows diagrammatically a modification of the embodiment of FIG. 10, FIG. 14 shows selection signals used in conjunction with FIG. 13, FIG. 15 shows blanking signals used in conjunction with FIG. 13.

DETAILED DESCRIPTION OF THE DRAWINGS

Figure 1:
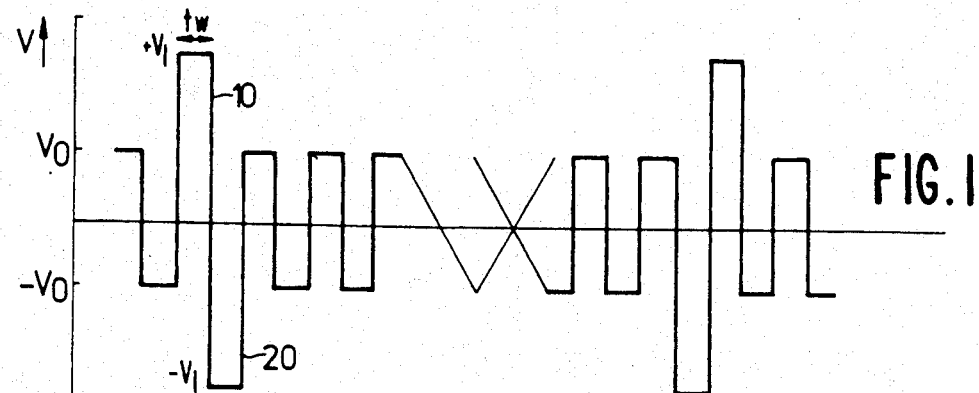
FIG. 1 shows a voltage applied across a ferro-electric display element, FIG. 2 describes the associated transmission behavior of the display element in response to the voltage shown in FIG. 1.

FIG. 1 shows the switching behaviour of a ferro-electric display element. Such a display element principally comprises two flat parallel substrates each being provided with electrodes between which the ferro-electric liquid crystal is present.

Figure 2:
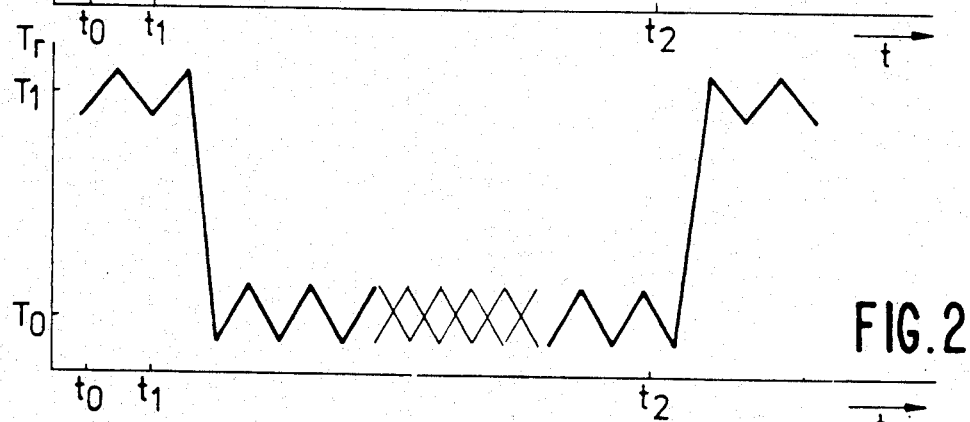

A voltage as shown in FIG. 1 is applied across the display element via the electrodes, while the associated transmission behaviour is shown in FIG. 2.

At the instant $t=t_0$ the display element is, for example, in such a state that it is substantially light-transmissive (transmission level or transmission value $T_1$). A bipolar signal consisting of alternating positive and negative square-wave voltages having a fixed pulse width $t_w$ and a voltage of $+V_0$ and $-V_0$, respectively, is presented to the electrodes of the display element. The (absolute) value of $V_0$ is chosen to be such that the ferro-electric display element cannot switch to another transmission state at the given pulse width. The ferro-electric liquid crystal has such a short switching time that it tends to follow the bipolar signal. This results in a ripple on the transmission level having a value which is dependent on the voltage $V_0$ and on the speed of the ferro-electric liquid crystal.

At the instant $t=t_1$ a bipolar pulse is presented whose sub-signals 10 and 20 have a pulse width $t_w$, while the amplitude is $V_1 \cdot V_1$ and $t_w$ are chosen to be such that the display element can be brought substantially to the light-absorbing state (transmission level $T_0$) by the sub-signal 20. Subsequently a bipolar signal having voltage values $\pm V_0$ is presented across the display element. In a similar manner as described above, this leads to a ripple on the transmission level $T_0$.

At the instant $t=t_2$ there is a switch back to transmission level $T_1$ with a bipolar signal which is inverse to that at $t=t_0$.

Since, as described above, the signal on the single display element has an ideal square wave during the period $t_1-t_2$ with an equal pulse width and an alternating positive and negative amplitude, the average transmission value $T_0$ is constant and the ripple is defined. If the display element forms part of a matrix of display elements, however, successive signals may amplify one another in practice so that the amplitude of the ripple becomes larger, while the average transmission level may also shift (at most over a distance equal to the ripple amplitude).

Figure 3:
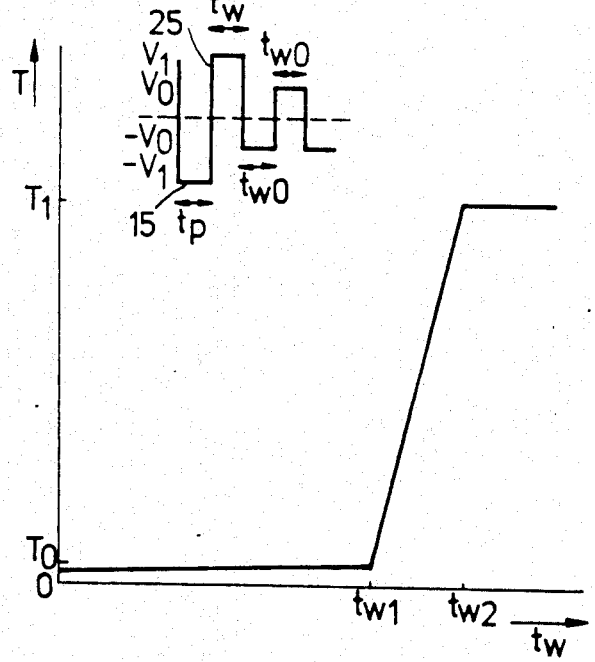
FIG. 3 shows diagrammatically the relationship between the width $t_w$ of a bipolar signal having a fixed amplitude and the transmission value for such a display element.

FIG. 3 shows how the transmission level for the said display element depends on the pulse width $t_w (\leq t_{w0})$ when using signals with amplitudes $V_0$, $V_1$. The bipolar signals with amplitude $\pm V_0$ have sub-signals with a fixed pulse width $t_{w0}$. For the signal with amplitude $\pm V_1$ it holds that the second sub-signal 25 with voltage $V_1$ has a variable pulse width and the first sub-signal 15 with voltage $-V_1$ has a pulse width $(2t_{w0}-t_w)$.

The product $V_1 \cdot t_{w0}$ is chosen to be such that the display element reaches an extreme state (in this case transmission value $T_0$) by means of the sub-signal 15.

It is apparent from the Figure that the transmission level is substantially not influenced for pulse widths $t_w \leq t_{w1}$, while at $t_w=t_{w2}$ the display element is substantially switched to the other transmission level. Intermediate transmission levels (grey scales) are obtained with pulse widths of between $t_{w1}$ and $t_{w2}$. These levels are produced because dipoles associated with the ferro-electric liquid crystal molecules may flip over under the influence of the applied voltage. Larger or smaller numbers of domains having a different transmission state (for example, light-transmissive in an ambiance which is light-absorbing, or vice versa) are formed on a microscopic scale, which domains determine the macroscopic transmission level, or the grey scale of the display element.

In the method according to FIG. 3 the ratio between the voltages $V_1$ and $V_0$ is approximately 2 to 3 in practice. If ferro-electric liquid crystals are used in a matrix of display elements, it would be possible for such a display element to react, in the case of passive drive and after selection, to the voltages for display elements selected at a later stage. The ferro-electric medium may then be so fast that these data voltages are followed, producing a ripple on the transmission level which has a very disturbing effect, notably in the case of intermediate level setting (grey scale). Since, according to the invention, the data signals are bipolar, it is at least achieved that the grey scales (that is to say, the number of domains) are set around a dynamic balance. However, dependent on the data voltages, and without taking further measures, the ripple may still be considerable.

As already noted, grey scales can be obtained by varying the pulse width $t_w$ (FIG. 3) between $t_{w1}$ and $t_{w2}$. This is a practical drawback, notably for matrix display devices, because the different pulse width must be set per period per display element, which is difficult to realize from an electrical point of view, particularly because the actual variation in grey scales (for example, 64 grey scales) must be obtained by a variation of the leading edge of the sub-signal 25 over approximately 20% of the pulse width, that is to say, over approximately 10–20 μsec in practice at line periods of 64 μsec (PAL, NTSC).

Figure 4:
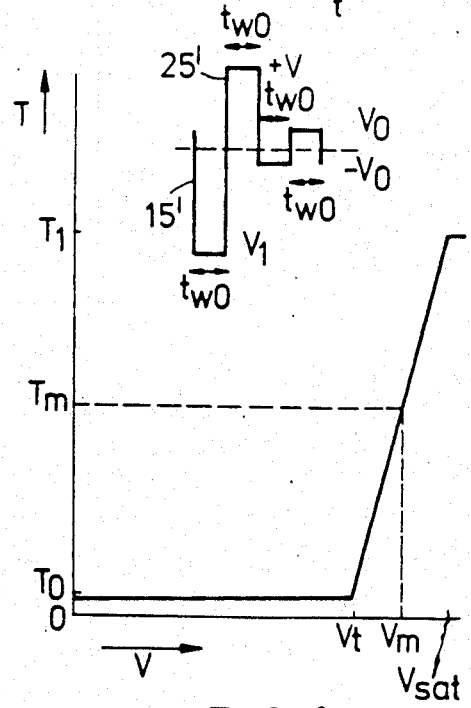
FIG. 4 shows diagrammatically a similar relationship between the absolute value V of a bipolar signal having a fixed pulse width and the transmission value.

It has been found that the switching of ferro-electric liquid crystal display elements not only depends on the pulse width of the sub-signals but also on the amplitude. FIG. 4 shows how the transmission level T at a fixed pulse width $t_{w0}$ and a variable amplitude V of the bipolar signal 25' depends on the amplitude V. An amplitude $V_1$ is chosen for the sub-signal 15' such that an extreme transmission value is reached.

It is apparent therefrom that within a small voltage range $(V_{sat}-V_t)$ the grey scale can be set for a fixed pulse width by variation of the amplitude of the sub-signal 25'. In a matrix display device this means that a grey scale can be set by voltage modulation within a very small voltage range during a fixed line period or a fixed part thereof (for example, half the line period or a quarter of a line period).

The method according to the invention utilizes this aspect; on the other hand it utilizes the fact that the selection signal in a display matrix can be chosen to be such that an average transmission level $T_m$ associated with a voltage $$V_m = \frac{V_t + V_{sat}}{2}$$

is reached in the case of a zero voltage at the data electrodes. For a given fixed (sub)line period a modulation with values of between $-V_{Dmax}$ and $V_{Dmax}$, in which $(V_{sat}-V_t)=2V_{Dmax}$, is sufficient to realize intermediate transmission levels (grey scales). Since the ratio $V_{Dmax}/V_1$ (approximately 1/5) is much smaller than $V_0/V_1$ of FIG. 1, the crosstalk is considerably smaller and hence the ripple on the transmission level is substantially negligible. As a result it is practically unnecessary to apply a high-frequency square-wave voltage on the selection lines during non-selection, as is shown, for example, in EP 0,214,856.

Figure 6:
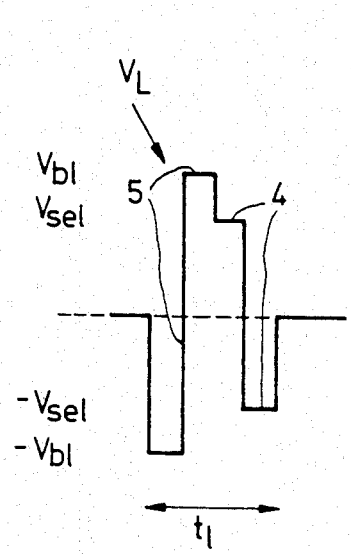
FIG. 6 shows the voltage variation applied to the row electrodes in accordance with FIG. 5, FIGS. 7, 8 and 9 show examples of voltage variations across display elements in accordance with FIG. 5.
Figure 5:
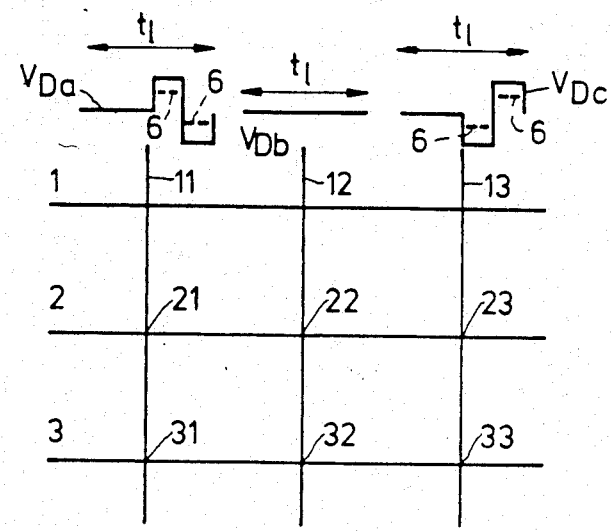
FIG. 5 shows diagrammatically a first embodiment of a method according to the invention.

FIG. 5 shows a practical embodiment of a first method according to the invention. The display device is composed of a matrix of display elements 21, 22, 23, . . . , 31, 32, 33 which are located at the area of crossings of row electrodes 1, 2, 3, . . . and column electrodes 11, 12, 13 which are present on different substrates of a ferro-electric liquid crystal display element. As shown in FIG. 6, during a line period $t_l$ the row electrodes are provided with a signal $V_L$ having a bipolar selection signal 4 of $\pm V_{sel}$, which selection signal 4 is preceded by an auxiliary signal or "blanking" signal 5 of $\pm V_{bl}$ in which $V_{bl}$ is such a high voltage that the display element reaches an extreme transmission state in the time $\frac{1}{4} t_l$. Due to the effect of the subsequent simultaneously presented bipolar selection signals and data signals a desired transmission state is reached.

Figure 7:
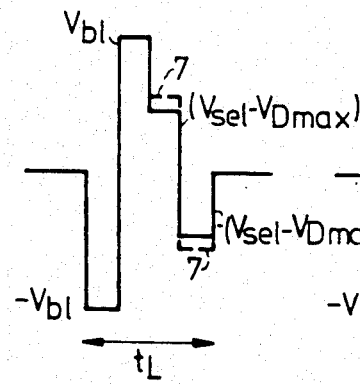
Figure 8:
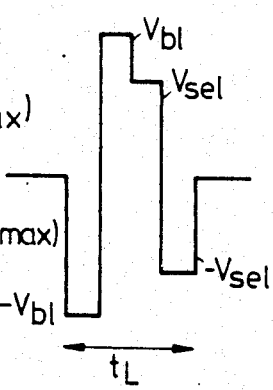
Figure 9:
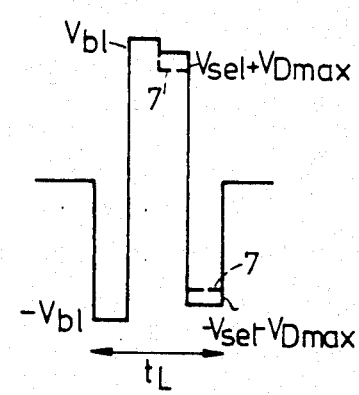

The ferro-electric liquid crystal medium switches at each selection, as it were, from an extreme state determined by the "blanking" signal. Preferably, this is the substantially non-transmissive state. This is favourable for reasons of perception. By giving the first part of the selection signal 4 the same sign as the second part of the "blanking" signal 5, it is achieved that the display element reaches the desired transmission value via a voltage variation during selection, at which this advantage is maintained. This is apparent from the voltages across the display elements 21, 22, 23 as shown in FIGS. 7, 8, 9, associated with the voltage variation $V_L$ presented to the row electrodes and the voltages $V_D$ presented to the column electrodes. A data signal $V_{Da}$ which is equal to zero Volt during $\frac{1}{4} t_l$ is presented to the column electrode 11 and subsequently it assumes the values $V_{Dmax}$ during $\frac{1}{4} t_l$ and then the value $-V_{Dmax}$ during $\frac{1}{4} t_l$, in which $2V_{Dmax} \geq (V_{sat}-V_t)$ (FIG. 3). During the entire period $t_l$ a signal of zero Volt is presented to the column electrode 12, while a signal which is inverse to that on the column electrode 11 is presented to the column electrode 13.

FIGS. 7, 8, 9 show the actual voltage variation across the display elements 21, 22, 23 if a signal $V_L$ is presented to row electrode 2 during the same line period $t_l$. For the first half of the line period ($\frac{1}{2} t_l$) this is identical for all three display elements, while bipolar signals are present across the display elements during the second half of the line periods with voltage values of $\pm(V_{sel}-V_{Dmax})$ (FIG. 7, element 21), $\pm V_{sel}$ (FIG. 8, element 22) and $\pm(V_{sel}+V_{Dmax})$ (FIG. 9, element 23). The broken lines 6, 7 in the signals a and c in FIGS. 7 and 9, respectively, indicate intermediate grey scales.

For a satisfactory operation it is necessary that $|V_{bl}| \geq |V_{sel}+V_{Dmax}|$ or $|V_{bl}| \geq |V_{sel}|+|V_{Dmax}|$.

In a subsequent selection period the voltage on the row electrode 2 is zero Volt. The setting of the display elements 21, 22, 23, which have acquired a certain setting with the aid of the bipolar data signal $V_D$, can only be influenced by voltages on the data electrodes 11, 12, 13.

This has little influence because these voltages are only present during half a line period and have only a small amplitude (of the order of at most $\frac{1}{2}(V_{sat}-V_t)$). The voltages have a bipolar character; possible deviations of the transmission state caused by the first part of a presented data signal which is experienced as crosstalk by the display elements 21, 22, 23 are substantially entirely compensated for by the second part of the bipolar data signal. In this way a dynamic balance is reached, as it were, because a given quantity of domains "flips over" via the selection signal in co-operation with a data signal.

Dependent on the subsequent "bipolar interference signals" this number increases or decreases, which gives rise to a hardly visible ripple on the set transmission value (grey scale) due to the small amplitude of the data signals.

FIG. 10 shows a similar method in which a bipolar data signal $V_{Da}$, $V_{Db}$, $V_{Dc}$ is presented during the entire line period $t_l$, the first part of the data signal $V_D$ coinciding with the first part of the selection signal $V_{sel}$. In the line period preceding the selection signal a bipolar auxiliary signal ("blanking" signal) is presented to the row electrode, as shown in FIG. 11. Since data signals for a previous row electrode (in this example row electrode 1) are presented during the presentation of this "blanking" signal, the "blanking" signal is not identical for all display elements, but is dependent on the presented signals $V_D$. For the signals $V_{Da}$, $V_{Db}$ and $V_{Dc}$ this is shown in FIG. 12 by the lines a', b', c', while for the intermediate signals denoted by broken lines 6 this is indicated by broken lines 7'. The signals $V_{Da}$, $V_{Db}$ and $V_{Dc}$ lead to voltages across the display elements 21, 22, 23 as indicated by a, b and c during selection of row electrode 2. Due to disturbances caused by data voltages which are present, the absolute, effective voltage across a display element during "blanking" may be at least $|V_{bl}-V_{Dmax}|$, so that it holds for a satisfactory operation that $|V_{bl}|-|V_{Dmax}| \geq |V_{sel}|+|V_{Dmax}|$ in which $V_{Dmax}$ is the maximum data voltage determined by the transmission-voltage curve for a given line period. Since the data/selection signals are now presented during a full line period, slower ferro-electric liquid crystals may be used in this method or, conversely, the line periods or voltages may be reduced. After selection transmission values once set are maintained due to the bipolar character of the data signals because a dynamic balance is produced between domains which have flipped over and domains which have not flipped over.

As has been stated, reaching the extreme state is dependent on both duration and voltage value of the auxiliary signal. In FIG. 13 the "blanking" signal is presented during two line periods before the selection signal. Dependent on the type of ferro-electric liquid crystal, the extreme state is then reached at a voltage which may be much lower than that referred to in the previous examples.

In a line period subsequent to "blanking" a selection is made in a similar manner as in the example of FIG 12, as shown in FIG. 15, whereafter at most a slight influence of the data signals is visible due to their bipolar character.

A condition for the satisfactory operation is that the bipolar pulse whose parts have a pulse width $t_l$ and an amplitude of at least $|V_{bl}-V_{Dmax}|$ can bring the ferro-electric display element to an optically extreme state. An advantage of this method is that much lower auxiliary voltages (blanking voltages) may suffice.

The invention is of course not limited to the embodiments shown, but several variations are possible within the scope of the invention. For example, during non-selection a high-frequency bipolar signal can be presented, if desired, to the row electrodes so that a possible ripple in the transmission value is still further reduced.

We claim:

1. A method of driving a display device comprising a ferro-electric liquid crystalline medium between two supporting plates, the first plate comprising a system of row electrodes and the second plate comprising a system of column electrodes defining at least one display element at the area of the crossings of row and column electrodes, said display element reaching a desired transmission state from an extreme transmission state during selection, characterized in that during selection by a bipolar selection signal, said display element reaches the desired transmission state from the extreme transmission state via drive voltages comprising said bipolar selection signal and a bipolar auxiliary signal each comprising a plurality of sub-signals on the row electrodes and data voltages on the column electrodes, which data voltages are bipolar, said desired transmission state being reached dependent on the data voltages which are substantially simultaneously presented and change polarity approximately simultaneously with said bipolar selection signal which is presented to the row electrode at least for a part of a line period.

2. A method as claimed in claim 1, characterized in that prior to the bipolar selection signal on a row electrode said bipolar auxiliary signal is presented to said row electrode, said sub-signals of said bipolar auxiliary signal each having a duration and height sufficient to bring the display element to an extreme state.

3. A method as claimed in claim 1, characterized in that the average voltage across said display element is substantially zero Volt.

4. A method as claimed in claim 2, characterized in that the bipolar auxiliary signal and the bipolar selection signal are presented within one line period.

5. A method as claimed in claim 4, characterized in that for a given line period which is at least four times the switching period of the ferro-electric liquid crystalline medium, data voltages are presented which have a maximum value equal to at least a voltage magnitude representing half of the voltage range within which a transition from one extreme electro-optical state to another extreme electro-optical state is effected in the transmission-voltage characteristic associated with a quarter of the line period, while the absolute value of said sub-signals of said bipolar auxiliary signal is at least equal to the sum of the absolute value of the maximum data signal and the absolute value of said sub-signals of the bipolar selection signal.

6. A method as claimed in claim 2, characterized in that the bipolar auxiliary signal is presented during at least one line period prior to the line period in which said bipolar selection signal is presented.

7. A method as claimed in claim 6, characterized in that the auxiliary signal is presented during the line period prior to the line period in which said bipolar selection signal is presented.

8. A method as claimed in claim 7, characterized in that for a given line period which is at least twice the switching period of the ferro-electric liquid crystalline medium, said data voltages are presented which have a maximum value equal to at least a voltage magnitude representing half of the voltage range within which a transition from one extreme electro-optical state to another extreme electro-optical state is effected in the transmission-voltage characteristic associated with the line period, while the difference between the absolute value of said sub-signals of said bipolar auxiliary signal and the absolute value of the maximum data voltage is at least equal to the sum of the absolute value of the maximum data voltage and the absolute value of said sub-signals of said bipolar selection signal.

9. A method as claimed in claim 4, characterized in that a first sub-signal of said bipolar auxiliary signal and a second sub-signal of said bipolar selection signal have the same polarity.

10. A method as claimed in claim 9, characterized in that the ferro-electric liquid crystalline medium is brought to the substantially non-transmissive state by means of said bipolar auxiliary signal.

11. A method as claimed in claim 2, characterized in that the average voltage across said display element is substantially zero Volt.

12. A method as claimed in claim 3, characterized in that the bipolar auxiliary signal and the bipolar selection signal are presented within one line period.

13. A method as claimed in claim 11, characterized in that the bipolar auxiliary signal and the bipolar selection signal are presented within one line period.

14. A method as claimed in claim 3, characterized in that the bipolar auxiliary signal is presented during at least one line period prior to the line period in which said bipolar selection signal is presented.

15. A method as claimed in claim 11, characterized in that the bipolar auxiliary signal is presented during at least one line period prior to the line period in which said bipolar selection signal is presented.

16. A method as claimed in claim 5, characterized in that a first sub-signal of said bipolar auxiliary signal and a second sub-signal of said bipolar selection signal have the same polarity.

17. A method as claimed in claim 6, characterized in that a first sub-signal of said bipolar auxiliary signal and a second sub-signal of said bipolar selection signal have the same polarity.

18. A method as claimed in claim 7, characterized in that a first sub-signal of said bipolar auxiliary signal and a second sub-signal of said bipolar selection signal have the same polarity.

* * * * *